(12) United States Patent
Liu et al.

(10) Patent No.: US 12,009,541 B2
(45) Date of Patent: Jun. 11, 2024

(54) BATTERY GROUP AND OUTPUT STRUCTURE THEREOF

(71) Applicant: DONGGUAN AMPEREX TECHNOLOGY LIMITED, Dongguan (CN)

(72) Inventors: Xiaoping Liu, Dongguan (CN); Xiaoming Chen, Dongguan (CN); Li Li, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 450 days.

(21) Appl. No.: 17/218,099

(22) Filed: Mar. 30, 2021

(65) Prior Publication Data
US 2021/0218105 A1    Jul. 15, 2021

Related U.S. Application Data

(63) Continuation of application No. PCT/CN2020/097226, filed on Jun. 19, 2020.

(30) Foreign Application Priority Data

Jun. 21, 2019    (CN) .......................... 201920951242.7

(51) Int. Cl.
*H01M 50/296*    (2021.01)
*H01M 50/204*    (2021.01)
(Continued)

(52) U.S. Cl.
CPC ....... *H01M 50/296* (2021.01); *H01M 50/204* (2021.01); *H01M 50/284* (2021.01);
(Continued)

(58) Field of Classification Search
CPC ............. H01M 50/296; H01M 50/519; H01M 50/516; H01M 50/569; H01M 50/204; H01M 50/284
See application file for complete search history.

(56) References Cited

U.S. PATENT DOCUMENTS

2011/0248719 A1* 10/2011 Aoki ................... H01M 10/482
324/426

FOREIGN PATENT DOCUMENTS

CN         103296241 A        9/2013
CN         103427062 A    *  12/2013
(Continued)

OTHER PUBLICATIONS

Translation JP2018026215 (Year: 2018).*
(Continued)

*Primary Examiner* — Jane J Rhee
(74) *Attorney, Agent, or Firm* — Morgan, Lewis & Bockius LLP

(57) ABSTRACT

An output structure of a battery group, including an output terminal, a circuit board, a first terminal, and a conductive member. The first terminal is electrically connected to the circuit board; the conductive member is electrically connected to the circuit board; the first terminal is welded to the conductive member; and the output terminal is welded to the conductive member or the first terminal. In the output structure provided by this application, the output terminal, the first terminal, and the conductive member are fixedly connected by welding. The output structure has advantages such as stable connection, stable welding quality, easy control, and being not easy to loosen, and can effectively avoid the serious heating caused by the increase of internal resistance at the joint, and thus can avoid the risk of a battery fire caused by the heating.

19 Claims, 6 Drawing Sheets

(51) Int. Cl.
    *H01M 50/284* (2021.01)
    *H01M 50/516* (2021.01)
    *H01M 50/519* (2021.01)
    *H01M 50/569* (2021.01)

(52) U.S. Cl.
    CPC ....... *H01M 50/516* (2021.01); *H01M 50/519* (2021.01); *H01M 50/569* (2021.01)

(56) References Cited

FOREIGN PATENT DOCUMENTS

| | | | |
|---|---|---|---|
| CN | 103427062 | A | 12/2013 |
| CN | 207938703 | U | 10/2018 |
| CN | 209822766 | U | 12/2019 |
| JP | 2015511384 | A | 4/2015 |
| JP | 2018026215 | A * | 2/2018 |
| JP | 2018164008 | A | 10/2018 |
| JP | 2020514988 | A | 5/2020 |

OTHER PUBLICATIONS

CN103427062 translation (Year: 2013).*
International Search Report and Written Opinion, PCT/CN2020/097226, dated Sep. 9, 2020, 9 pgs.
Dongguan Amperex Technology Limited, JP2021512770, Notice of Reasons for Refusal, dated Apr. 27, 2022, 4 pgs.
Dongguan Amperex Technology Limited, JP2021512770, Notice of Reasons for Refusal, dated Dec. 13, 2022, 4 pgs.
Dongguan Amperex Technology Limited, JP2021512770, Decision to Grant a Patent, dated Mar. 23, 2023, 5 pgs.
Dongguan Amperex Technology Limited, AU2020294731, Examination Report No. 1, dated Feb. 9, 2022, 4 pgs.
Dongguan Amperex Technology Limited, AU2020294731, Notice of acceptance, dated Sep. 6, 2022, 4 pgs.
Dongguan Amperex Technology Limited, IN202117017267, Examination Report, dated Jul. 2, 2022, 5 pgs.
Dongguan Amperex Technology Limited, CN201920981242.7, Office Action, dated Nov. 7, 2019, 2 pgs.

* cited by examiner

BATTERY GROUP AND OUTPUT STRUCTURE THEREOF

CROSS REFERENCE TO RELATED APPLICATIONS

This application is a continuation application of PCT Patent Application No. PCT/CN2020/097226, filed on Jun. 19, 2020, which claims priority to Chinese Patent Application No. 201920951242.7, filed with the State Intellectual Property Office of the People's Republic of China on Jun. 21, 2019, all of which are incorporated herein by reference in their entirety.

TECHNICAL FIELD

This application relates to the field of battery technologies, and in particular, to an output structure of a battery group and a battery group containing the output structure.

BACKGROUND

At present, an output connection method of a battery group usually welds a tab to a conductive plate which is then connected to a wire with a locking screw. Due to the complexity to process locking screws, the processing cost is high, and the connection between the wire and the conductive plate is unstable, making it difficult to ensure desirable contact internal resistance of the locking screw. During vibration, particularly, the screw is easily loosened, causing serious heating at the joint due to the increase of internal resistance. The risk of a battery fire is increased and the assembly quality is difficult to control. In addition, using this solution can occupy a larger space and increase the difficulty of assembling the battery group.

SUMMARY

In view of the above situation, it is necessary to provide an output structure with advantages such as simple structure, stable connection, low production cost, and being not easy to loosen, and a battery group containing the output structure.

An embodiment of this application provides an output structure of a battery group, including an output terminal, a circuit board, a first terminal, and a conductive member. The first terminal is electrically connected to the circuit board; the conductive member is electrically connected to the circuit board; the first terminal is welded to the conductive member; and the output terminal is welded to the conductive member or the first terminal.

In some embodiments of this application, the conductive member is arranged between the output terminal and the first terminal, or the first terminal is arranged between the conductive member and the output terminal.

In some embodiments of this application, a welding layer is arranged between the conductive member and the circuit board.

In some embodiments of this application, the conductive member includes a first conductive sheet and a second conductive sheet, where the first conductive sheet, the output terminal, and the first terminal are connected by welding, and the second conductive sheet is electrically connected to the circuit board.

In some embodiments of this application, the first conductive sheet is arranged between the first terminal and the output terminal, or the first terminal is arranged between the output terminal and the first conductive sheet.

In some embodiments of this application, a welding layer is arranged between the second conductive sheet and the circuit board.

In some embodiments of this application, the battery group includes a plurality of battery cells connected in series or parallel, the circuit board is provided with a plurality of pads, and the pads are arranged in correspondence with positive terminals or negative terminals of the battery cells.

In some embodiments of this application, the circuit board is provided with a voltage detection line, and the voltage detection line is electrically connected to each of the pads.

In some embodiments of this application, the output terminal includes a connecting portion and an output portion, a first end of the connecting portion is electrically connected to the conductive member or the first terminal, and a second end of the connecting portion is electrically connected to the output portion.

In some embodiments of this application, the connecting portion is a sheet structure.

In some embodiments of this application, the output structure further includes a second terminal, where the second terminal is electrically connected to a negative terminal of the battery.

This application further provides a battery group, where the battery group includes a plurality of battery cells connected in series or parallel and the output structure according to any one of the foregoing embodiments, where the first terminal of the output structure is formed by one positive terminal of the plurality of battery cells, or the first terminal is electrically connected to a positive terminal of the plurality of battery cells.

In some embodiments of this application, the conductive member is arranged between the output terminal and the first terminal, or the first terminal is arranged between the conductive member and the output terminal.

In some embodiments of this application, a welding layer is arranged between the conductive member and the circuit board.

In some embodiments of this application, the conductive member comprises a first conductive sheet and a second conductive sheet connected to the first conductive sheet; wherein the first conductive sheet, the output terminal, and the first terminal are connected by welding; and the second conductive sheet is electrically connected to the circuit board.

In some embodiments of this application, the first conductive sheet is arranged between the first terminal and the output terminal, or the first terminal is arranged between the output terminal and the first conductive sheet.

In some embodiments of this application, a welding layer is arranged between the second conductive sheet and the circuit board.

In some embodiments of this application, the battery group comprises a plurality of battery cells connected in series or parallel, the circuit board is provided with a plurality of pads, and the pads are arranged in correspondence to positive terminals or negative terminals of the battery cells.

In some embodiments of this application, the circuit board is provided with a voltage detection line, and the voltage detection line is electrically connected to each of the pads.

In some embodiments of this application, the output terminal comprises a connecting portion and an output portion, a first end of the connecting portion is electrically connected to the conductive member or the first terminal, and a second end of the connecting portion is electrically connected to the output portion.

Figure 1:
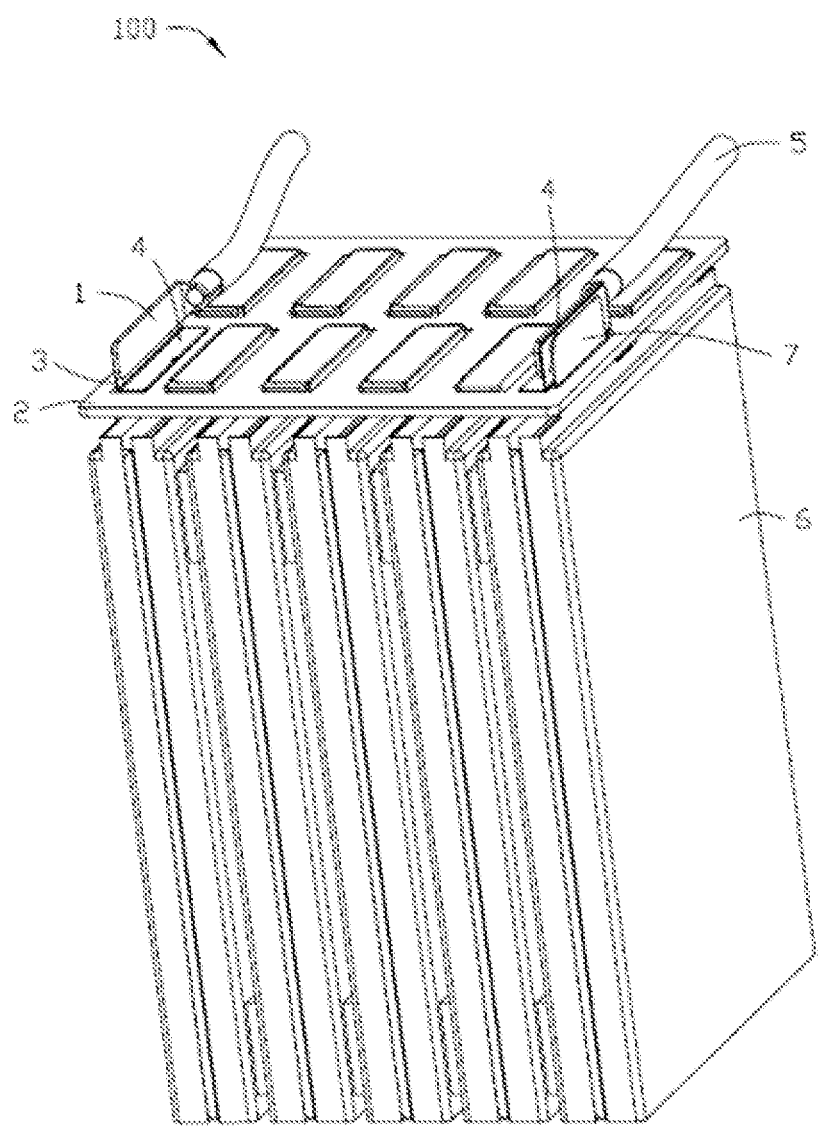
FIG. 1 is a schematic structural diagram of the connection between an output structure and a battery group according to an embodiment of this application.

Reference signs of main components:
output structure 100
output terminal 1
circuit board 2
pad 21
pin pad 22
voltage detection line 23
first terminal 3
conductive member 4
first conductive sheet 41
second conductive sheet 42
wire 5
battery group 6
connector 61
battery cell 62
second terminal 7

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application.

Referring to FIG. 1, an output structure 100 is used to connect a battery group 6 and a wire 5, and the output structure 100 includes an output terminal 1, a circuit board 2, a first terminal 3, and a conductive member 4. The first terminal 3 is electrically connected to the circuit board 2. The conductive member 4 is electrically connected to the circuit board 2. The first terminal 3 is welded to the conductive member 4. The output terminal 1 is welded to the conductive member 4 or the first terminal 3.

Compared with the prior art, in the output structure 100 provided by the embodiments of this application, the output terminal 1, the first terminal 3, and the conductive member 4 are fixedly connected by welding. The output structure 100 has advantages such as stable connection, stable welding quality, easy control, and being not easy to loosen, and can effectively avoid the serious heating caused by the increase of internal resistance at the joint, and thus can avoid the risk of a battery fire caused by the heating. In addition, the output structure 100 can further reduce the production cost of a battery group and reduce the assembly difficulty thereof.

Figure 2:
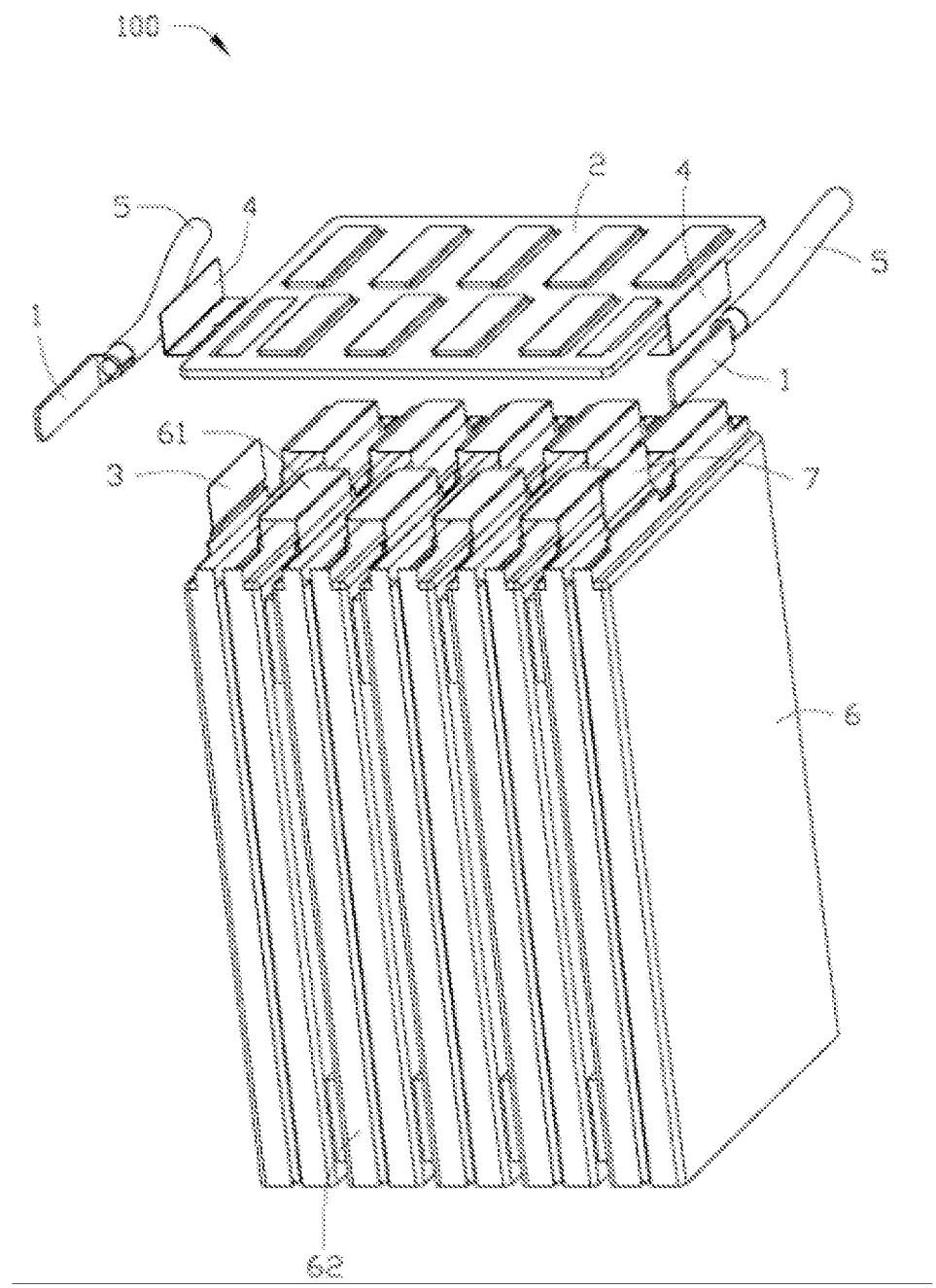
FIG. 2 is an exploded schematic diagram of the output structure of FIG. 1.

Specifically, referring to FIG. 2, the output structure 100 may further include a second terminal 7, where the second terminal 7 is electrically connected to a negative terminal of the battery group 6, and the first terminal 3 is electrically connected to a positive terminal of the battery group 6. In some embodiments, the battery group 6 may include a plurality of battery cells 62 connected in series or parallel, each of which includes a positive terminal and a negative terminal. The battery cells 62 can be connected in series or parallel to form the battery group 6 using a prior combination method. This is not limited in this application. It can be understood that in other embodiments, the first terminal 3 may be formed by a positive terminal of one of the battery cells 62, and the second terminal 7 may include a negative terminal of one of the battery cells 62. Alternatively, the first terminal 3 is electrically connected to a positive terminal of the battery cells 62, and the second terminal is electrically connected to a negative terminal of the battery cells 62.

The plurality of battery cells 62 are connected in series or parallel by using a plurality of connectors 61 to electrically connect the positive terminals and the negative terminals of the different battery cells 62. The plurality of connectors 61 are electrically connected to the circuit board 2 so as to electrically connect the battery group 6 to the circuit board 2. It can be understood that in other embodiments, the positive terminals or the negative terminals of the different battery cells 62 may be combined by bonding, welding, or the like to form a connector 61. The output terminal 1 is further connected to the wire 5 to output electric energy of the battery group 6 or charge the battery group 6 through the wire 5, or to electrically connect an electrical device through the wire 5.

Figure 3:
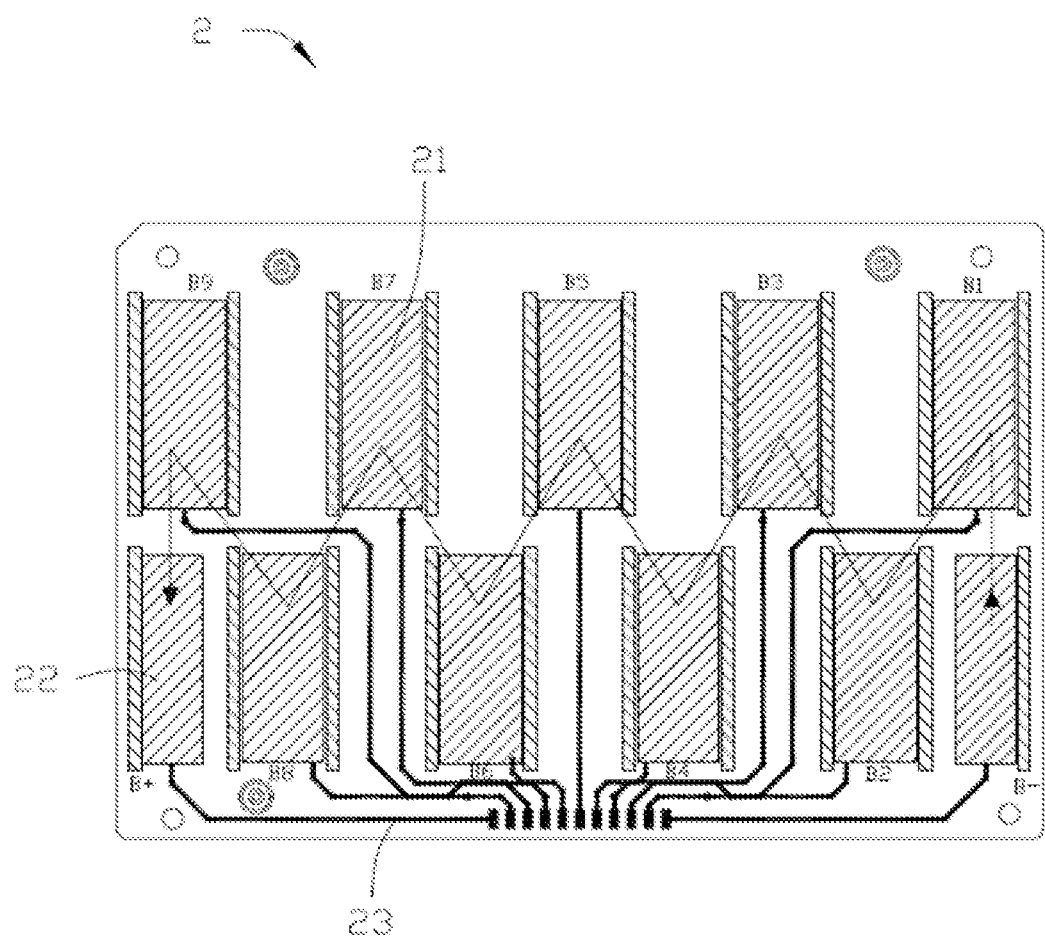
FIG. 3 is a schematic structural diagram of a circuit board in the output structure of FIG. 1.

Still referring to FIG. 3, the circuit board 2 is provided with a plurality of pads 21, and the pads 21 are arranged in correspondence to the positive terminals or the negative terminals of the battery cells 62. Specifically, the plurality of connectors 61 can be connected to the corresponding pads 21 by welding, so that the positive terminals or the negative terminals of the battery cells 62 are electrically connected and correspond to the pads 21. The plurality of pads 21 are provided with marks "B1 to B9" to indicate correspondence to the battery cells 62, making it easy to electrically connect the battery cells 62 to the pads 21 with corresponding marks, thereby reducing installation difficulty of the output structure 100. The quantity and marks of the pads 21 can be increased or decreased according to actual conditions. The arrow direction between the pads 21 in FIG. 3 is the direction of current flowing in the circuit board 2 after the battery group 6 is electrically connected to the circuit board 2.

In some embodiments, the circuit board 2 is further provided with a pin pad 22 that is electrically connected to the circuit board 2 at a position close to a side, and a welding layer is arranged between the conductive member 4 and the circuit board 2. In other words, the welding layer can be arranged between the conductive member 4 and the pin pad 22, which is beneficial for the conductive member 4 to be connected to the pin pad 22 by means of surface mounting or like technologies, so that the conductive member 4 is electrically connected to the circuit board 2. In some embodiments, there are preferably two pin pads 22 which are respectively arranged on two sides of the circuit board 2. One pin pad 22 is marked with "B+" at its lower end, which indicates a positive electrode; and the other pin pad 22 is marked with "B—" at its lower end, which indicates a negative electrode. The conductive member 4 arranged at the pin pad 22 marked "B+" is fixed to the first terminal 3, and the conductive member 4 arranged at the pin pad 22 marked "B—" is fixed to the second terminal 7.

In some embodiments, the circuit board 2 is further provided with a voltage detection line 23, and the voltage detection line 23 is electrically connected to each of the pads 21 and the pin pad 22. The voltage detection line 23 has a central portion formed at a position close to the lower edge of the circuit board 2, and tributary lines electrically connected to the pads 21 and the pin pad 22 converge at the central portion, arranged in order. Voltages of the battery cells 62 or the voltage between the positive and negative electrodes of the battery group 6 can be determined by detecting voltages between the tributary lines at the central portion. This facilitates easy and convenient operation and is conducive to quickly judging the working condition of the battery cells 62 or the battery group 6.

Figure 4:
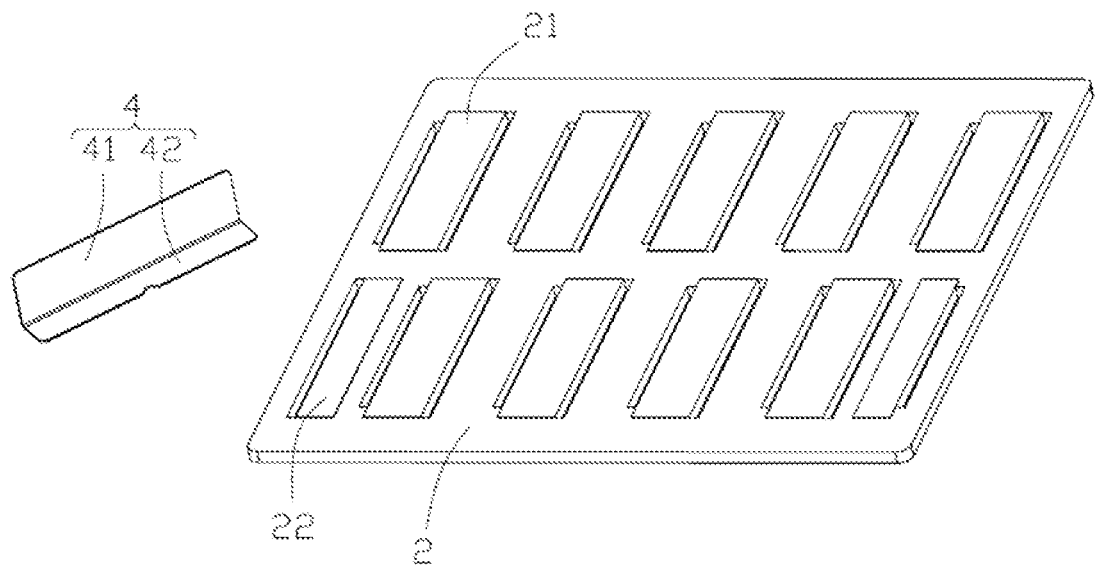
FIG. 4 is a schematic structural diagram of a conductive member and a circuit board in the output structure of FIG. 2 before being combined.
Figure 5:
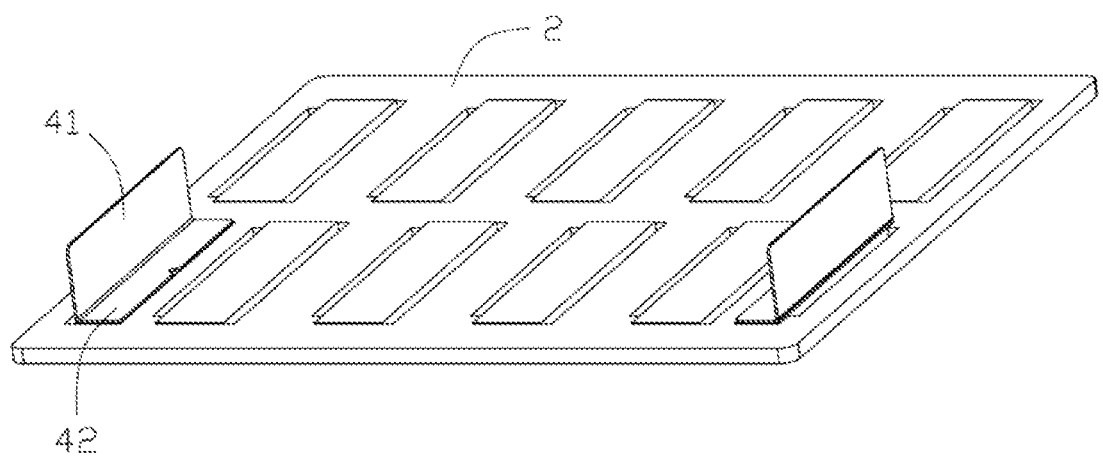
FIG. 5 is a schematic structural diagram of the conductive member and the circuit board in FIG. 4 after being combined.

In some embodiments, referring to FIG. 4 and FIG. 5, the conductive member 4 includes a first conductive sheet 41 and a second conductive sheet 42. The first conductive sheet 41 and the second conductive sheet 42 are connected at substantially a right angle, or may be connected at other angles, and the two may be formed as an integral structure. The first conductive sheet 41, the output terminal 1, and the first terminal 3 or the second terminal 7 are connected by welding, and the welding method is preferably laser welding. The second conductive sheet 42 is electrically connected to the pin pad 22 of the circuit board 2, a welding layer is arranged between the second conductive sheet 42 and the pin pad 22, and the welding layer is formed by applying solder paste onto a steel mesh. The conductive member 4 is hard to some extent so as to fix the welding position onto the circuit board 2 while avoiding shaking of the welding position and improving stability of the welding quality.

Figure 6:
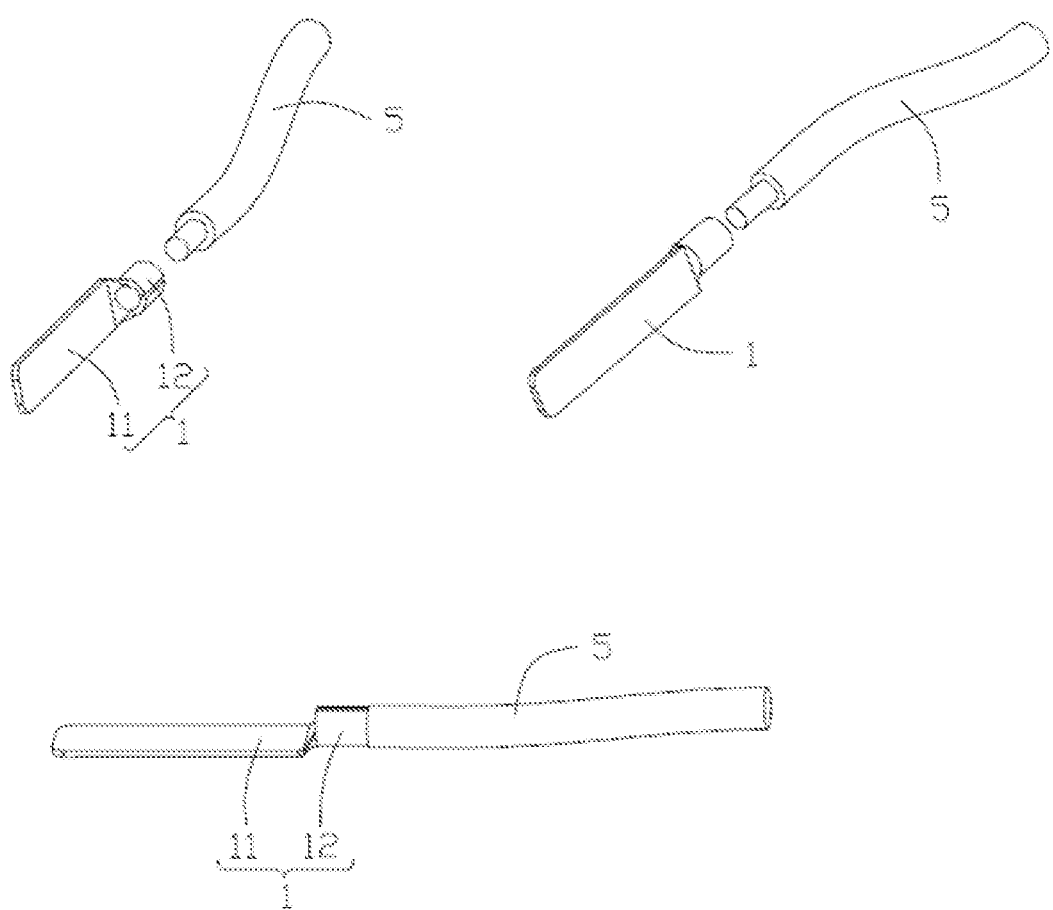
FIG. 6 is a schematic diagram illustrating how a wire is connected to an output terminal in the output structure of FIG. 1.

Referring to FIG. 6, in some embodiments, the output terminal 1 includes a connecting portion 11 and an output portion 12. A first end of the connecting portion 11 is electrically connected to the conductive member 4 or the first terminal 3. A second end of the connecting portion 11 is electrically connected to the output portion 12, and the output portion 12 is electrically connected to the wire 5. The connecting portion 11 is substantially a sheet structure, the shape and size of which match the first conductive sheet 41. The output portion 12 is substantially a hollow cylinder with cracks on its periphery. An end of the wire 5 is inserted into the output portion 12 and connected to the output portion 12 by mechanical crimping. It can be understood that in other embodiments, the wire 5 may alternatively be connected to the output portion 12 by welding. The connecting portion 11 and the output portion 12 may be formed as an integral structure. The output terminal 1 is preferably a copper terminal, which is made of red copper with excellent thermal conductivity, electrical conductivity, ductility and corrosion resistance, and good welding performance. The model of the wire 5 matches the overcurrent parameter requirement of the battery group 6.

Figure 7:
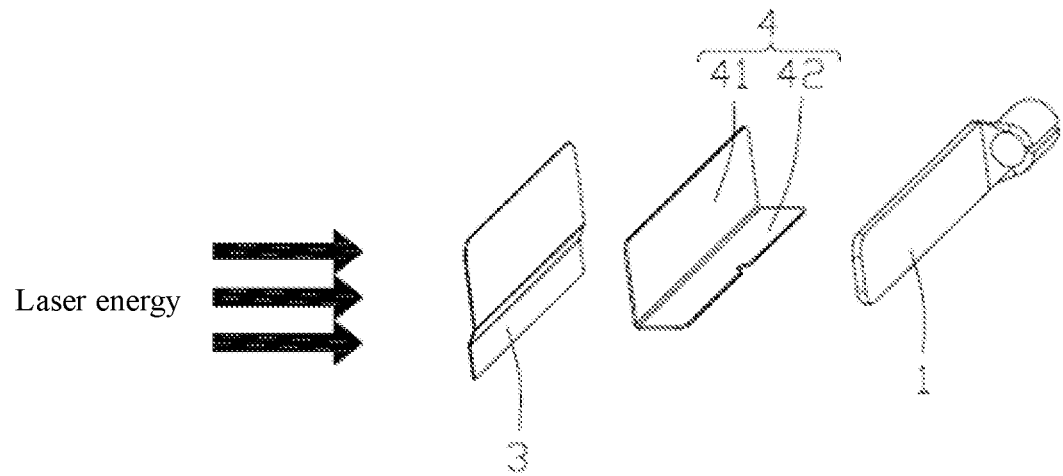
FIG. 7 is a schematic diagram illustrating how a first terminal, a conductive member, and an output terminal of an output structure are welded in an embodiment of this application.

Referring to FIG. 7, the conductive member 4, the output terminal 1, and the first terminal 3 (or the second terminal 7) are connected together by laser welding, the first conductive sheet 41 of the conductive member 4 is arranged between the output terminal 1 and the first terminal 3, and laser energy is directed from the first terminal 3 toward the output terminal 1.

Figure 8:
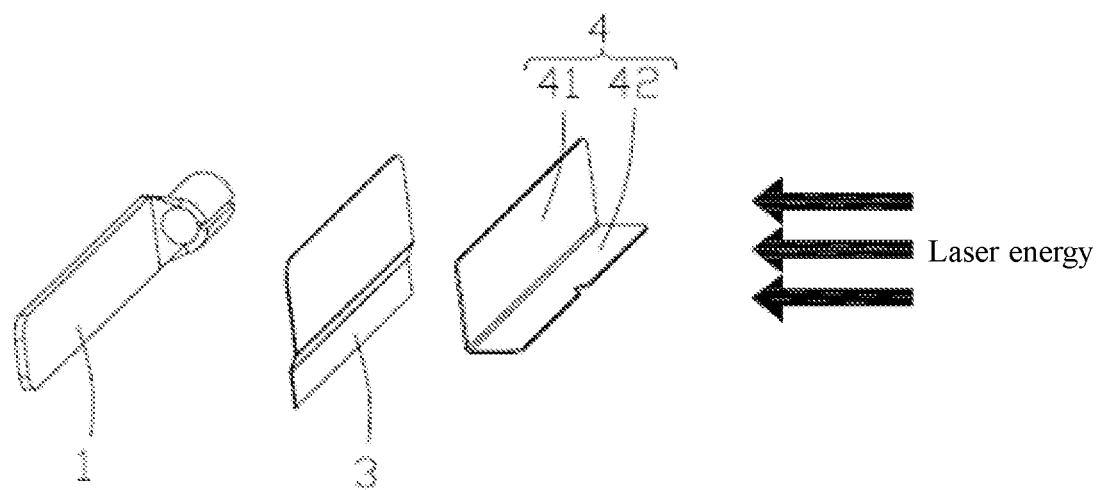
FIG. 8 is a schematic diagram illustrating how a first terminal, a conductive member, and an output terminal of an output structure are welded in another embodiment of this application.

Referring to FIG. 8, in another embodiment, the first terminal 3 (or the second terminal 7) is arranged between the first conductive sheet 41 of the conductive member 4 and the output terminal 1, and laser energy is directed from the conductive member 4 toward the output terminal 1. Preferably, the position of the output terminal 1 depends on the direction of the laser energy, and the output terminal is always arranged at the most forward side of the laser direction to ensure the effect of laser welding.

It can be understood that in other embodiments, the output terminal 1 may alternatively be arranged between the first terminal 3 and the first conductive sheet 41, and laser energy may be directed from the first terminal 3 toward the first conductive sheet 41, or from the first conductive sheet 41 toward the first terminal 3. The overlapping area of the output terminal 1, the first terminal 3, and the first conductive sheet 41 matches the overcurrent parameter of the battery group 6. A larger overcurrent parameter of the battery group 6 indicates a larger overlapping area.

Referring to FIG. 1 again, after the output structure 100 is welded, the first terminal 3 (or the second terminal 7) and the output terminal 1 are connected and fixed by the conductive member 4. Output current of the battery group 6 is transmitted from the first terminal 3 or the second terminal 7 to the circuit board 2 and the conductive member 4, and then to the output terminal 1, and finally to the wire 5, thereby realizing a good electrical connection between battery group 6 and an external electrical device.

This application further provides a battery group, where the battery group includes a plurality of battery cells 62 connected in series or parallel and any one of the foregoing output structures 100. The first terminal 3 of the output structure 100 is formed by one positive terminal of the plurality of battery cells 62, or the first terminal 3 is electrically connected to a positive terminal of the plurality of battery cells 62.

In some embodiments of this application, the conductive member is arranged between the output terminal and the first terminal, or the first terminal is arranged between the conductive member and the output terminal.

In some embodiments of this application, a welding layer is arranged between the conductive member and the circuit board.

In some embodiments of this application, the conductive member comprises a first conductive sheet and a second conductive sheet connected to the first conductive sheet; wherein the first conductive sheet, the output terminal, and the first terminal are connected by welding; and the second conductive sheet is electrically connected to the circuit board.

In some embodiments of this application, the first conductive sheet is arranged between the first terminal and the output terminal, or the first terminal is arranged between the output terminal and the first conductive sheet.

In some embodiments of this application, a welding layer is arranged between the second conductive sheet and the circuit board.

In some embodiments of this application, the battery group comprises a plurality of battery cells connected in series or parallel, the circuit board is provided with a plurality of pads, and the pads are arranged in correspondence to positive terminals or negative terminals of the battery cells.

In some embodiments of this application, the circuit board is provided with a voltage detection line, and the voltage detection line is electrically connected to each of the pads.

In some embodiments of this application, the output terminal comprises a connecting portion and an output portion, a first end of the connecting portion is electrically connected to the conductive member or the first terminal, and a second end of the connecting portion is electrically connected to the output portion.

The foregoing implementations are merely intended to describe the technical solutions of this application, but not intended to constitute any limitation. Although this application is described in detail with reference to the foregoing preferred implementations, persons of ordinary skill in the art should understand that modifications or equivalent replacements can be made to the technical solutions of this application, without departing from the spirit and scope of the technical solutions of this application.

What is claimed is:

1. An output structure of a battery group, comprising:
   an output terminal;
   a circuit board;
   a first terminal electrically connected to the circuit board; and
   a conductive member electrically connected to the circuit board;
   wherein, the first terminal is welded to the conductive member;
   the output terminal is welded to the conductive member or the first terminal; and
   the output terminal is further connected to a wire to output electric energy of the battery group, charge the battery group, or electrically connect an electrical device to the battery group through the wire, wherein the conductive member comprises a first conductive sheet and a second conductive sheet directly connected to the first conductive sheet; wherein the first conductive sheet, the output terminal, and the first terminal are connected by welding; and the second conductive sheet is electrically connected to the circuit board.

2. The output structure of the battery group according to claim 1, wherein the conductive member is arranged between the output terminal and the first terminal, or the first terminal is arranged between the conductive member and the output terminal.

3. The output structure of the battery group according to claim 1, wherein a welding layer is arranged between the conductive member and the circuit board, and the output terminal, the first terminal, and a portion of the conductive member are bonded to and overlap with each other.

4. The output structure of the battery group according to claim 1, wherein the first conductive sheet is arranged between the first terminal and the output terminal, or the first terminal is arranged between the output terminal and the first conductive sheet.

5. The output structure of the battery group according to claim 1, wherein a welding layer is arranged between the second conductive sheet and the circuit board.

6. The output structure of the battery group according to claim 1, wherein the battery group comprises a plurality of battery cells connected in series or parallel, the circuit board is provided with a plurality of pads, and the pads are arranged in correspondence to positive terminals or negative terminals of the battery cells.

7. The output structure of the battery group according to claim 6, wherein the circuit board is provided with a voltage detection line, and the voltage detection line is electrically connected to each of the pads.

8. The output structure of the battery group according to claim 1, wherein the output terminal comprises a connecting portion and an output portion, a first end of the connecting portion is electrically connected to the conductive member or the first terminal, and a second end of the connecting portion is electrically connected to the output portion.

9. The output structure of the battery group according to claim 8, wherein, the connecting portion is a sheet structure.

10. The output structure of the battery group according to claim 8, further comprising a second terminal, and the second terminal is electrically connected to a negative terminal of the battery group.

11. A battery group, comprising:
    a plurality of battery cells connected in series or parallel; and
    the output structure of a battery group according to claim 1,
    wherein the first terminal of the output structure is formed by one positive terminal of the plurality of battery cells, or the first terminal is electrically connected to a positive terminal of the plurality of battery cells.

12. The battery group according to claim 11, wherein the conductive member is arranged between the output terminal and the first terminal, or the first terminal is arranged between the conductive member and the output terminal.

13. The battery group according to claim 11, wherein a welding layer is arranged between the conductive member and the circuit board.

14. The battery group according to claim 11, wherein the conductive member comprises a first conductive sheet and a second conductive sheet connected to the first conductive sheet; wherein the first conductive sheet, the output terminal, and the first terminal are connected by welding; and the second conductive sheet is electrically connected to the circuit board.

15. The battery group according to claim 14, wherein the first conductive sheet is arranged between the first terminal and the output terminal, or the first terminal is arranged between the output terminal and the first conductive sheet.

16. The battery group according to claim 14, wherein a welding layer is arranged between the second conductive sheet and the circuit board.

17. The battery group according to claim 11, wherein the battery group comprises a plurality of battery cells connected in series or parallel, the circuit board is provided with a plurality of pads, and the pads are arranged in correspondence to positive terminals or negative terminals of the battery cells.

18. The battery group according to claim 17, wherein the circuit board is provided with a voltage detection line, and the voltage detection line is electrically connected to each of the pads.

19. The battery group according to claim 11, wherein the output terminal comprises a connecting portion and an output portion, a first end of the connecting portion is electrically connected to the conductive member or the first terminal, and a second end of the connecting portion is electrically connected to the output portion.

* * * * *